United States Patent [19]

Dube

[11] 3,912,147

[45] Oct. 14, 1975

[54] WIRE FEEDING MECHANISM

[75] Inventor: Paul Omer Dube, Chelmsford, Mass.

[73] Assignee: King Instrument Corporation, Westboro, Mass.

[22] Filed: Dec. 17, 1973

[21] Appl. No.: 424,943

[52] U.S. Cl. ................. 226/151; 226/109; 226/167

[51] Int. Cl.[2] ................. B65H 17/44

[58] Field of Search ........... 226/146, 147, 151, 162, 226/167, 109, 115

[56] References Cited

UNITED STATES PATENTS

| | | | |
|---|---|---|---|
| 540,543 | 6/1895 | Ebert | 226/151 |
| 1,056,444 | 3/1913 | Perkins | 226/147 |
| 1,749,505 | 3/1930 | Pierce | 226/151 |
| 1,936,940 | 11/1933 | Johnson | 226/151 |
| 2,388,423 | 11/1945 | Langdon | 226/151 |
| 2,685,362 | 8/1954 | Larsen | 226/151 |
| 2,810,573 | 10/1957 | Nadel | 226/151 |
| 2,978,160 | 4/1961 | Bunnell | 226/151 |
| 3,061,163 | 10/1962 | Black et al. | 226/167 |
| 3,148,817 | 9/1964 | Lord | 226/151 |
| 3,578,229 | 5/1971 | Macomber | 226/151 |

*Primary Examiner*—Evon C. Blunk
*Assistant Examiner*—Richard K. Thomson
*Attorney, Agent, or Firm*—Schiller & Pandiscio

[57] ABSTRACT

The invention is a mechanism for feeding a wire and comprises a first pair of jaws mounted on a stationary support, a second pair of jaws mounted on a transport member that is movable relative to the stationary support, and wire guiding means. The two pairs of jaws are aligned with the wire guiding means and the jaws are adapted so that the wire is gripped by one pair of jaws and released by the other pair of jaws when the transport member is moved in one direction and is released by the one pair of jaws and gripped by the other pair of jaws when the transport member is moved in the opposite direction.

7 Claims, 3 Drawing Figures

WIRE FEEDING MECHANISM

This invention relates to the manufacture of magnetic tape cassettes and more particularly to an improved device for feeding staking material for staking tape to hubs of tape cassettes.

Magnetic tape cassettes of the type to which the invention relates are exemplified in U.S. Pat. Nos. 3423038 and 3167267. Basically the cassette comprises a rectangular case containing a length of magnetic recording tape whose ends are connected to a pair of hubs (also called reels or spools) that are rotatably mounted in the case. The hubs are annular and have radially keying lugs and slots which interfit spindles on a tape recorder or cassette player so that the hubs will rotate with the spindles and thereby cause the tape to be paid off of one hub and wound on the other hub. The magnetic tape cassettes are available commercially with either blank or pre-recorded tape, with the latter either secured directly to the hubs or spliced to two leaders that are attached to the holes.

A preferred method of attaching leader or recording tape to cassette hubs is by staking (also called "pinning"). Essentially this requires a "key-hole" type hub which has a radial slot on its outside periphery and a small diameter staking pin made of a material such as nylon or acetal resin that is forced into the slot together with the leader or recording tape, so that the tape is trapped between and gripped tightly by the hub and the pin. Since the radial slot of each of the hubs are of uniform size, the pins must also be of uniform size in order that the pins and slots will effectively grip the tape.

Several devices are known in the prior art which dispense a predetermined length of staking wire, including means for cutting the predetermined length of wire into staking pins, and means for staking the leader or recording tape to the cassette hubs with the staking pins. U.S. Pat. No. 3677505 issued to George Van Taylor discloses one such device which utilizes plastic wires as staking pins. The wires are supplied from wire supply spools and are driven by a motor-clutch arrangement. The wire is unwound from the spools, driven up through openings in a base plate and forced against stops which are mounted on the top of staking hammers. The openings in the base plate are located to position the staking wires in front of curved portions of the staking hammers. When the staking wire end bears against the underside of overhanging portions of the stops, the friction clutch slips preventing the wire from being jammed. Short sections of the wires used as staking pins are sheared off by the hammers which also function to drive the staking pins into the hubs.

The means for feeding the predetermined length of wire in the Van Taylor device has a number of limitations.

Another prior art device for staking tape to hubs is disclosed in Belgian Pat. No. 779855 issued Aug. 25, 1972. In this particular staking device, the staking rod feed mechanism comprises guide wheels having grooved rims which cooperate with feed wheels having knurled surfaces to grip the staking wire. The amount of rotation of the feed wheels is controlled by the length of travel of a piston rod of a pneumatic actuator, the end of the piston rod being linked to and spaced from the rotation axis of the feed wheels. While this feeding device operates well, it is expensive to make and has been found to be too large for certain requirements.

Accordingly, an object of the present invention is to provide an improved mechanism for feeding staking wire which overcomes the above-mentioned problems.

Another object of the present invention is to provide an inexpensive as well as improved feeding mechanism for feeding a predetermined length of staking wire.

Yet another object of the present invention is to provide an improved staking wire feeding mechanism of the character described which has a minimum of parts.

Still other objects of the present invention will be apparent to persons skilled in the art from the description presented below.

The foregoing and other objects of my invention are achieved by a wire feeding apparatus which comprises a transport block which is mounted for reciprocal movement relative to a stationary support, at least one ratchet assembly comprising a pair of wiregripping jaws mounted on the block and a similar ratchet assembly mounted on the support. The jaws on the transport block are adapted to grip the staking wire when the block is moved toward the stationary support and to slip relative to the wire when the block is moved in the opposite direction. The jaws on the support allow the wire to slip through when the block is advanced and to grip the wire when the transport block is retracted to its original position. For a fuller understanding of the invention and knowledge of particular features and advantages thereof, reference should be made to the following complete description of the preferred embodiment of the invention, taken in conjunction with the appended claims and accompanying drawings wherein:

In the drawings, like numerals refer to like parts.

Figure 1:
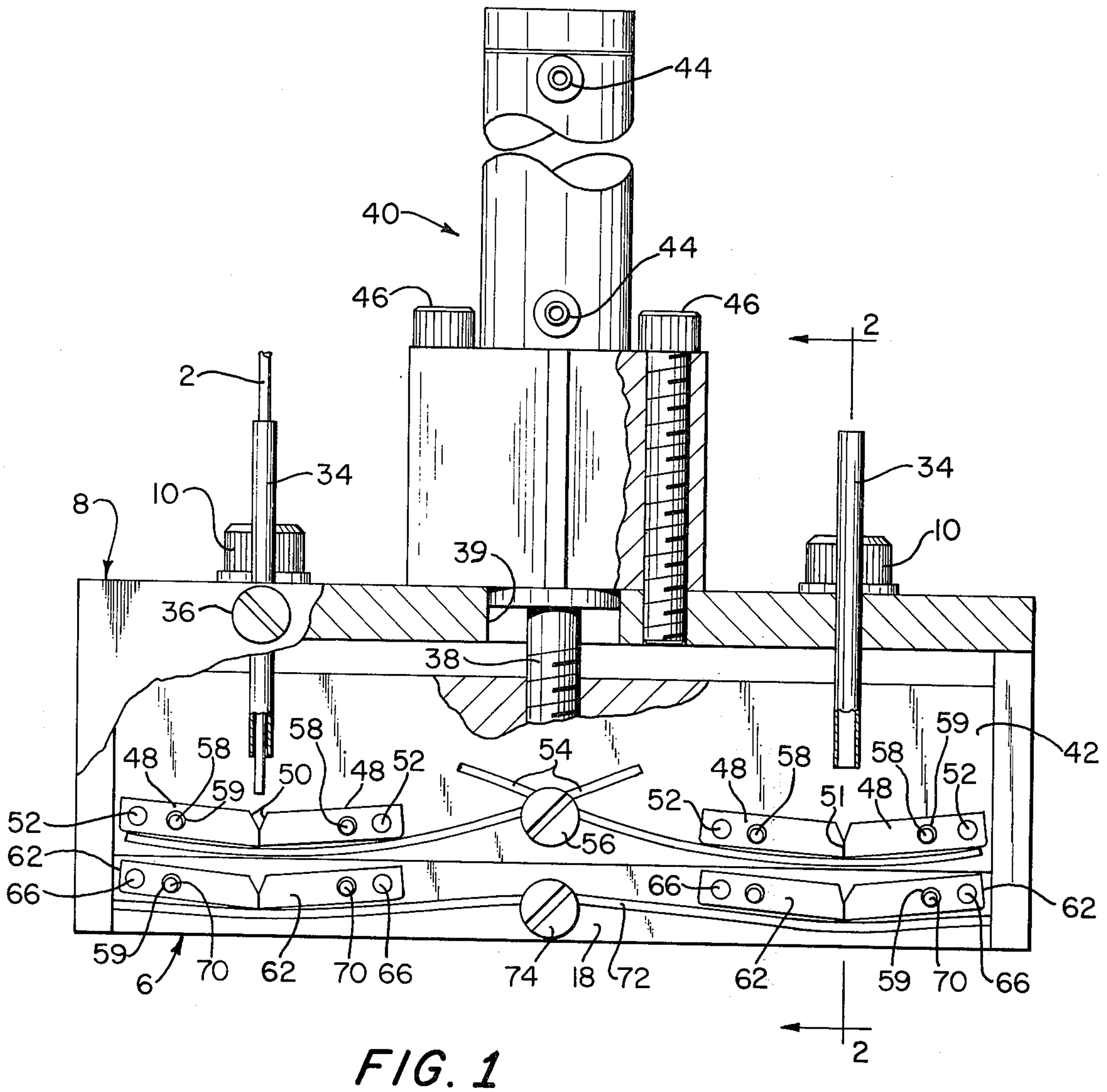
FIG. 1 is a top view, partly in section, of a preferred embodiment of the feeding mechanism.

Referring to the drawings, the illustrated wire feeding mechanism comprises a supporting block 6 and a cover plate 8 which are secured together with cap screws 10. Supporting block 6 is substantially rectangularly shaped with flat rectangular bottom, front and side surfaces. The top side of the supporting block 6 is recessed at 12 and 14 respectively. The depth of recess 14 is greater than the depth of recess 12 so as to form horizontal surfaces 18 and 20 and a front vertical wall 16. The block has opposite side walls 22 which extend above the upper surface 18.

Figure 2:
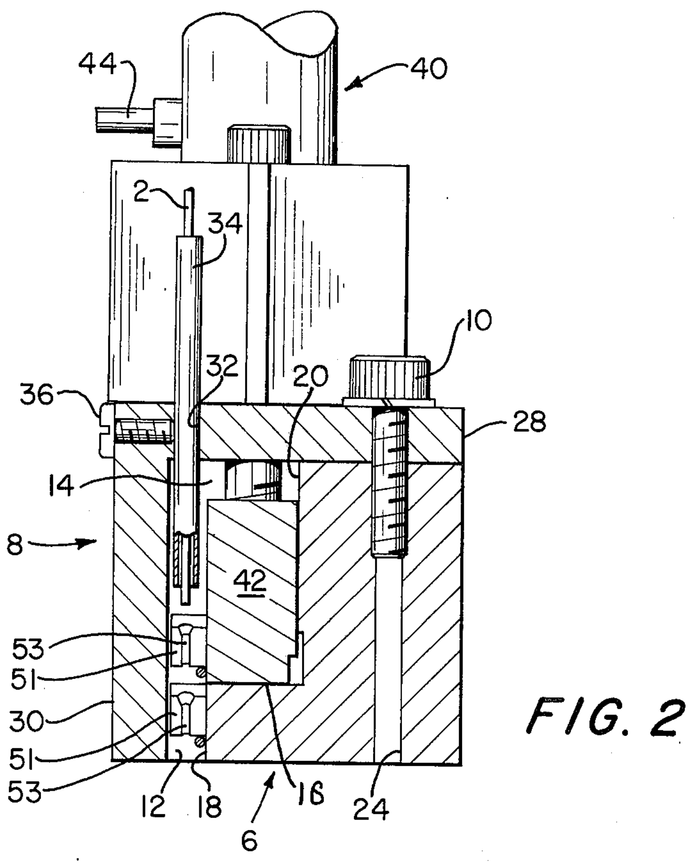
FIG. 2 is a cross-sectional view taken along line 2—2 of FIG. 1.
Figure 3:
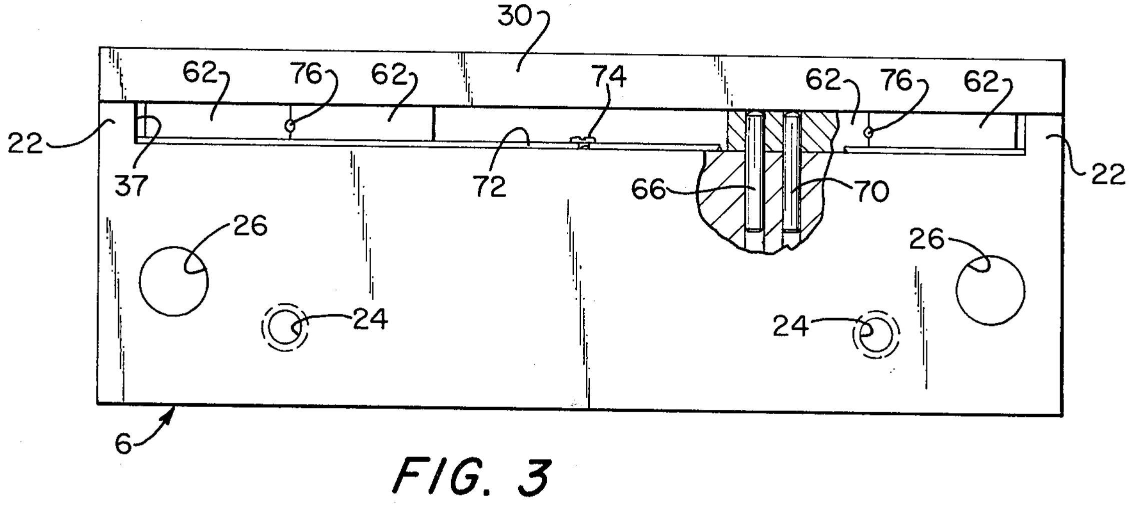
FIG. 3 is a front view, partly in section, of the embodiment shown in FIG. 1.

As shown in FIGS. 2 and 3, the block is also provided with two pairs of holes 24 and 26, all of which extend through the front and rear surfaces of the block below the recessed portions 12 and 14. The two holes 24 are threaded at the rear of the block in order to receive the screws 10. The other holes 26 are provided so that the feeding mechanism can be secured with cap screws to the rear side of a panel of a hub staking device, e.g. to the rear side of the base plate 12 of the apparatus shown in U.S. Pat. No. 3677505. Preferably cover plate 8 has two holes (not shown) each aligned with a hole 26, so that cap screws for mounting the mechanism can be passed through the cover plate and block 6 and screwed into tapped hole in the base or mounting panel of the hub staking machine.

As seen in side elevation (FIG. 2), the cover plate 8 is essentially of L-shaped cross-section with two rectangularly shaped flat sections 28 and 30 that are disposed at a right angle with respect to one another. The sections 28 and 30 overlie and engage the rear surface of block 6 and the upper surfaces of side walls 22 respectively. In addition to the holes required for cap screws 10 and the holes aligned with holes 26, section 28 of the cover plate has two additional holes 32 located close to section 30 for receiving two guide tubes 34. The function of the tubes 34 is to guide the plastic staking wire to the gripping jaws of the ratchet assemblies which are described in greater detail below. The tubes are constrained by means of set screws 36 which screw into tapped holes in the top of cover plate 8 and engage the tubes as shown in FIG. 2.

As seen in FIG. 3, when the cover plate 8 is secured to the block 6, a rectangular aperture 37 is formed on the front side of the assembly with the aperture being defined by surface 18, the inner surfaces of side walls 22, and the lower surface of section 30 of the cover plate.

Another larger hole 39 is provided approximately in the center of section 28 for receiving the piston rod 38 of a pneumatic actuator 40, the purpose of which will be explained in greater detail hereinafter.

A transport block 42 is disposed in the recess 14 of block 6 in slidable relation to surface 20. Block 42 is of rectangular configuration with a width which is only slightly less than the distance between the side walls 22, and a height, measured from the top to the bottom of the block, equal to the height of the vertical wall section 16. The top surface of block 42 is thus coplanar with surface 18. The depth of the block 42, i.e. its horizontal dimension as seen in FIG. 2, is less than the distance between the vertical wall section 16 and section 28 of cover plate 8. As will be seen, this difference in length is equal to or greater than the amount of plastic wire advanced through tubes 34 each time the feed mechanism is operated.

Transport block 42 is controllably reciprocated in cavity 14 by means of the pneumatic actuator 40. Actuator 40 preferably is of the double acting type, having ports with hose fittings 44 at the opposite ends of its cylinder through which air is alternately supplied from a high pressure source (not shown) to effect extension and retraction of its piston rod 38. Actuator 40 is mounted to section 28 of cover plate 8 by means of cap screws 46. The piston rod 38 of actuator 40 extends through opening 37 and its free end is anchored in block 42 by a screw connection as shown in FIG. 1.

Transport block 42 carries two like ratchet assemblies each comprising two gripping members or jaws 48. The gripping members are mounted on the top side of block 42 on each side of the center line of the block. Each member 48 is in the form of a flat bar that is pivotally mounted at one end on a pivot pin 52 that is anchored in block 42. The confronting ends of each pair of jaws 48 are bevelled at one corner as shown at 50 so as to provide an entranceway for inserting the plastic wire between them, and the remaining portions 51 of the confronting end surfaces are straight so as to be engageable with one another. These same portions 51 extend at angles slightly less than 90° to the longitudinal center lines of the bars. The pivot pins 52 are spaced from one another so that the confronting end portions 51 of the bars can engage each other. When the bars are so engaged, they are not aligned with a straight line extending between their respective pins 52 but rather are angled with respect to one another and their engaging portions 51 are slightly in front of such line, as well as being aligned with the center axis of the associated guide tube 34.

As shown in FIGS. 2 and 3, the contact ends 51 of bars 48 are each provided with a semi-circular groove 53 with the rear ends of the grooves being flared as shown in FIG. 2. The radius of curvature of each groove is made about the same as the radius of the plastic wire 2, but the depth of the groove is slightly less than the radius of the plastic wire, so that the jaws must separate slightly in order to accommodate the wire between them. The bars 48 are forced into contacting relationship by means of two wire springs 54. The inner ends of springs 54 are held against block 42 by means of a screw 56, while their outer ends are anchored in holes in the top of the block. Additional stop pins 58 anchored in block 42 project up through holes 59 in bars 48. Each hole 59 is oversized with respect to its pin 58 so that bars 48 are capable of limited pivotal movement about pins 52. Springs 54 urge the bars rearwardly about pins 52.

Two additional pairs of gripping members 62 are mounted on surface 18 of support block 6. These are identical to members 48. Gripping members 62 are pivotally mounted on pivot pins 66 which are anchored in surface 18. Additional pins 70 anchored in surface 19 project up into holes 59 of the two members. Each hole 59 is oversized with respect to its pin 70 so that members 62 are capable of limited pivotal movement about pins 66. As described above with respect to members 48, the members 62 are forced into contacting relationship by means of a common wire spring 72. The center of spring 72 is held against surface 18 by means of a screw 74. The ends of spring 72 are seated in holes in side walls 22. Gripping members 62 are positioned so that their engaging surfaces are aligned with guide tubes 34. The grooves in their engaging surfaces form apertures 76 (see FIG. 3) to accommodate the plastic staking wire.

Operation of the mechanism will now be described. For puposes of discussion, let it be assumed that the piston rod of the actuator 40 is retracted, i.e. transport block 42 is spaced from the vertical wall section 16, and plastic staking wires extend through each of the guide tubes 34 and through the apertures formed by the grooves of the aligned pairs of gripping member 48 and 62. If now the piston rod 38 is extended, block 42 will move toward wall section 16. As block 42 moves forward, ratchet members 48 will maintain a tight grip on the wires 2 because springs 54 will urge the ratchet members to pivot back against pins 58 and thereby tightly grip the wires. In this connection it is to be noted that when a wire 2 is inserted between a pair of gripping members 48, the gripping members pivot forward enough to accommodate the wire and their grooved surfaces 51 tend to diverge from one another. Hence when block 42 moves forward, the drag exerted by the wire on the rear ends of their surfaces 51 tends to cause them to pivot into more parallel relation with one another so that they tightly grip the wire. At the same time, since the holes 59 of bars 62 are larger than the stop pins 70, the force exerted by the advancing wires will cause those bars to slightly pivot forward and allow the wires to pass between them. In this way, each wire is advanced by an amount equal to the length of the forward stroke of the piston rod. When the piston rod is retracted, block 42 moves away from wall section 16. As this occurs, the wires will have a tendency to move in the same direction and spring 72 will cause gripping members 62 to pivot back so that their adjacent ends will grip the wires and thereby prevent them from moving. At the same time, the frictional contact of the wires with the ends of ratchet members 48 will cause the latter to pivot forward on pins 52 and thus permit their grooved ends to slide along the wires. Stated another way, when transport block 42 is advanced, the members 48 will close tight on the wires while members 62 will yield to allow the wires to be advanced with block 42; and when the transport block is retracted, member 62 will close tight on the wires while members 48 will separate enough to release and slip along the wires. The advancing wire moves out through the aperture 37 to the staking mechanism with which is it associated.

As a result of this type of operation, the lengths of wire are advanced a predetermined amount each time the ratchet block is reciprocated. The length of the stroke of the ratchet block can be controlled by shifting it along the threaded shaft of the piston rod, or by inserting limit stops or spacers between the transport block 42 and wall section 16 or section 28 of the cover plate.

It is to be understood that the mechanism may include means for mounting supply reels of wire for feeding through tubes 34 or the wire may be fed to tubes 34 from supply reels mounted some distance from the mechanism.

It is to be appreciated also that the present invention may be utilized to feed other flexible filmentary materials to machines other than hub staking devices and that the actuator 40 could be replaced by an electric motor driven reciprocating drive mechanism.

Although the feeding mechanism has been described as having two guide tubes 34 and two sets of gripping members 48 and gripping members 62, it will be apparent that the number of guide tubes 34 and sets of gripping members 48 and gripping members 62 may be varied without departing from the principles of the invention. Thus, only one guide tube 34, and single pairs of gripping members 48 and gripping members 62 could be employed to feed a single wire.

Since certain obvious changes may be made in the illustrated embodiment of the device without departing from the scope of the invention, it is intended that all matter contained herein be interpreted as illustrative and not in a limiting sense.

What is claimed is:

1. A device for feeding flexible wire comprising:

a supporting block having a first surface and a contiguous recess with a second surface that is offset from and extends parallel to said first surface;

a transport block slidably movable in said recess relative to said second surface and having a top surface substantially congruent with said first surface;

first and second pairs of jaws;

means for mounting said first pair of jaws on said top surface of said transport block so that said jaws can move in and out of contact with one another;

means for mounting said second pair of jaws on said first surface so that said jaws can move in and out of contact with one another;

spring means on said supporting block for urging said first pair of jaws into contact with one another;

spring means on said transport block for urging said second pair of jaws into contact with one another;

said first pair of jaws being disposed on opposite sides of a selected axis and said second pair of jaws being disposed on opposite sides of said same axis in spaced alignment with said first pair of jaws;

means extending through said support block into said recess and attached to said transport block for reciprocally moving said transport block relative to said second surface so that said second pair of jaws will move back and forth along said axis toward and away from said first pair of jaws; and guide means for guiding a flexible wire along said selected axis between said jaws, said jaws being adapted so that one pair of jaws grips said wire when said transport block moves in a first direction relative to said support block and the other pair of jaws grips said wire when said transport block moves in a second opposite direction relative to said support block.

2. A device in accordance with claim 1 wherein each pair of jaws comprises a pair of bars that are pivotally mounted at one end and are engageable with each other at the other end.

3. A device in accordance with claim 2 wherein said other ends of said bars are provided with grooved surfaces for gripping said wire.

4. A device in accordance with claim 1 further comprising stop means for limiting pivotal movement of said jaws.

5. A device in accordance with claim 4 wherein said stop means comprises a pin mounted on said support adjacent each of said first jaws.

6. A device in accordance with claim 4 wherein said stop means comprises an aperture in each of said second jaws and stop pins mounted to said moveable member and extending into said apertures, said apertures being large enough to permit limited pivotal movement of said first jaws.

7. A device in accordance with claim 1 wherein said means for reciprocally moving said member is a pneumatic actuator.

* * * * *